United States Patent [19]
Kastalsky et al.

[11] Patent Number: 6,097,145
[45] Date of Patent: Aug. 1, 2000

[54] AEROGEL-BASED PHASE TRANSITION FLAT PANEL DISPLAY

[75] Inventors: Alexander Kastalsky, Wayside, N.J.; Maurice Halioua, Sea Cliff, N.Y.; Sergey Shokhor, Sound Beach, N.Y.; Sylvain Naar, Scarsdale, N.Y.; Feliks Chudnovskiy, Bay Shore, N.Y.

[73] Assignee: Copytele, Inc., Huntington Station, N.Y.

[21] Appl. No.: 09/067,648

[22] Filed: Apr. 27, 1998

[51] Int. Cl.[7] .................................................. H01J 29/10
[52] U.S. Cl. ........................... 313/466; 313/112; 359/288
[58] Field of Search .................................. 313/110, 111, 313/112, 466, 498, 505; 359/288

[56] References Cited

U.S. PATENT DOCUMENTS

| | | | |
|---|---|---|---|
| 3,258,628 | 6/1966 | Acton | 313/505 |
| 4,015,166 | 3/1977 | Ohshima et al. | 313/505 |
| 4,670,690 | 6/1987 | Ketchpel | 313/505 |
| 5,079,473 | 1/1992 | Waymouth | 313/112 |
| 5,095,384 | 3/1992 | DeNatale | 359/288 |
| 5,608,568 | 3/1997 | Blodgett et al. | 359/288 |

*Primary Examiner*—Ashok Patel
*Attorney, Agent, or Firm*—Arthur L. Plevy; Buchanan Ingersoll PC

[57] ABSTRACT

A display device utilizes a plurality of pixels arranged in a predetermined configuration for recording and displaying information. Each pixel includes a substrate and a light modulating material for selectively modulating a predetermined wave length of light by transitioning between a first and a second state in response to a heater element. The light modulating material in the first state causes destructive interference in the predetermined wave length of light and in the second state causes constructive interference in the predetermined wave length of light. The pixel structure is buried within an aerogel thereby minimizing the heat dissipation rate from the pixels.

14 Claims, 7 Drawing Sheets

AEROGEL-BASED PHASE TRANSITION FLAT PANEL DISPLAY

CROSS-REFERENCE TO RELATED APPLICATIONS

The present application is related to commonly assigned patent application, Ser. No. 08/791,032, filed on Jan. 29, 1997, now U.S. Pat. No. 5,896,005, by Gurvitch et al., entitled "Phase Transition Flat Panel Display" incorporated herein by reference.

FIELD OF THE INVENTION

This invention relates to flat panel display devices and more particularly, to a membrane-free phase transition flat panel display utilizing Vanadium Dioxide ($VO_2$)-based pixels, employing a thick aerogel film as a heat resistant material, to electrically modulate light utilizing the phase transition property of $VO_2$.

BACKGROUND OF THE INVENTION

Application of Vadium Dioxide (VO2) based pixels for electrically modulating light utilizing the phase transition property of VO2 is well known in the art. VO2 exhibits an insulator-to-metal phase transition at a temperature $T_c$=68° C. which is accompanied by a significant change in electrical and optical properties. Due to this feature, this material has been utilized in various electrical and optical applications. These applications have included: a medium for holographic optical recording, a temperature stabilizer and controller, an electronic switch, material for screening and modulating microwave radiation and electronic and optical memory elements. One of the optical properties which is significantly changed during the phase transition is the index of refraction, which enables $VO_2$ to modulate light reflectance. The phase transition in $VO_2$ can be thermally induced by utilizing heater elements disposed under the film of this material. This feature can be utilized in the flat panel displays. An example of such a phase transition flat panel display is described in co-pending patent application Ser. No. 08/791,032 entitled "Phase Transition Flat Panel Display", incorporated herein by reference.

The prior art phase transition flat panel display comprises a plurality of individual VO2 based pixels, arranged in a conventional two dimensional matrix array fabricated on silicon substrates. Each pixel includes an optical resonator comprising a film of VO2 disposed on top of an aluminum mirror element. A film of polysilicon is disposed beneath the mirror element and acts as a heater element to heat the VO2 film to cause the phase transition of the pixel. An air gap is provided between the polysilicon heater film and the silicon substrate layer to minimize heat dissipation through the substrate. Each pixel is interconnected by column and a row line. A diode is coupled to each pixel and implemented as a pn junction fabricated on the silicon substrate. These diodes are utilized to prevent current spread and possible cross talk between the pixel elements.

While the prior art phase transition display has been proposed to provide high speed processing for video frequency operation, high resolution, gray levels, and color display, its manufacturing is rather complex. First, to make the temperature decay time as long as possible and thus minimize the display power consumption, each pixel is fabricated as a membrane disposed over the air gap in the Si substrate. Moreover, to further increase the decay time, the display must operate in a vacuum. Both these factors complicate the device manufacturing and increase production cost. Second, the pixel heaters are planned to be fabricated from poly-silicon. This requires display heating for poly-Si anneal and implantation to temperatures as high as 900° C. and thus makes it incompatible with the driving circuitry, which is designed to be fabricated on the same Si wafer prior to the pixel processing. Accordingly, an improved pixel structure for a phase transition display device which overcomes these problems is greatly desired.

SUMMARY OF THE INVENTION

The phase transition display device of the present invention contemplates a membrane-free pixel design utilizing a solid layer of aerogel as a heat resistant material disposed between a silicon (Si) substrate and the pixel structure, thereby eliminating the need for air gaps to thermally insulate each pixel. The phase transition display of the present invention also employs a thin film of $TaSi_2$ (tantalum silicide) material to act as the heater element in place of the polySi film used in the prior art. The $TaSi_2$ heater element is thinner than the polySi and therefore requires less heating than the polySi film. More importantly, it needs lower fabrication temperatures which makes it compatible with the processing of the drivers. A top surface of the silicon substrate is formed as small mesa "islands" surrounded by aerogel to minimize the heat transfer and thus increase the temperature decay time. A 100 um-wide aluminum row metal lines are formed on the Si substrate beneath the pixels to maintain a high optical fill-factor while minimizing the voltage drop across row wires. The heater element is then connected to the Si-based mesas via a thin film, preferably of platinum (Pt) to further reduce any lateral heat transfer from the pixel to the silicon wafer.

BRIEF DESCRIPTION OF THE DRAWINGS

The invention is to be explained in more detail below based on embodiments depicted in the following figures where.

DETAILED DESCRIPTION OF THE INVENTION

Before embarking on a detailed discussion of the improved pixel structure and formation of the present invention, a brief description of the operation of the phase transition display device is appropriate. For further detail, the reader is directed to co-pending patent application Ser. No. 08/791,032, filed on Jan. 29, 1997 by Gurvitch et al., entitled "Phase Transition Flat Panel Display".

The phase transition display is based upon the phase transition property of VO2 relating to this material transitioning between an insulator and a metal state at a particular temperature $T_c$. In the insulator state, VO2 has a lower conductivity and higher index of refraction, while in the metal state VO2 has a higher conductivity and lower index of refraction. The change of index of refraction in response to a change in temperature above (or below) its critical temperature enables VO2 films to modulate light for producing images. Transition from the insulator state to the metal state is achieved by heating the VO2 above its critical temperature $T_c$, which is approximately 68° C., while transition to the insulator state from the metal state occurs when the VO2 is cooled to a temperature below $T_c$. Thus, by using a heating element to selectively apply heat pulses to the VO2 film, transition between two reflective states can be achieved.

Figure 1:
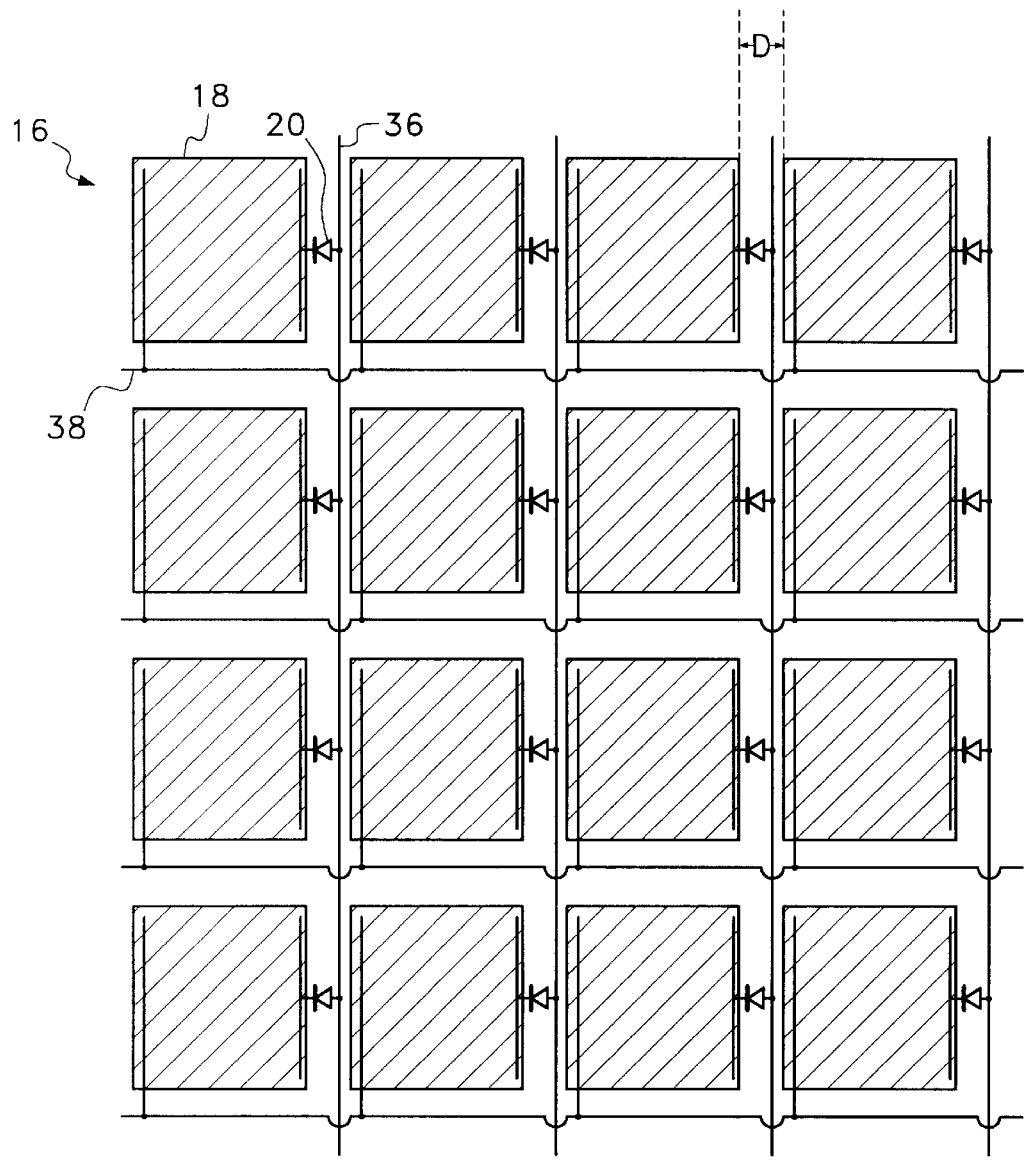
FIG. 1 is a sketch of the prior art phase transition display pixel matrix array.
Figure 2:
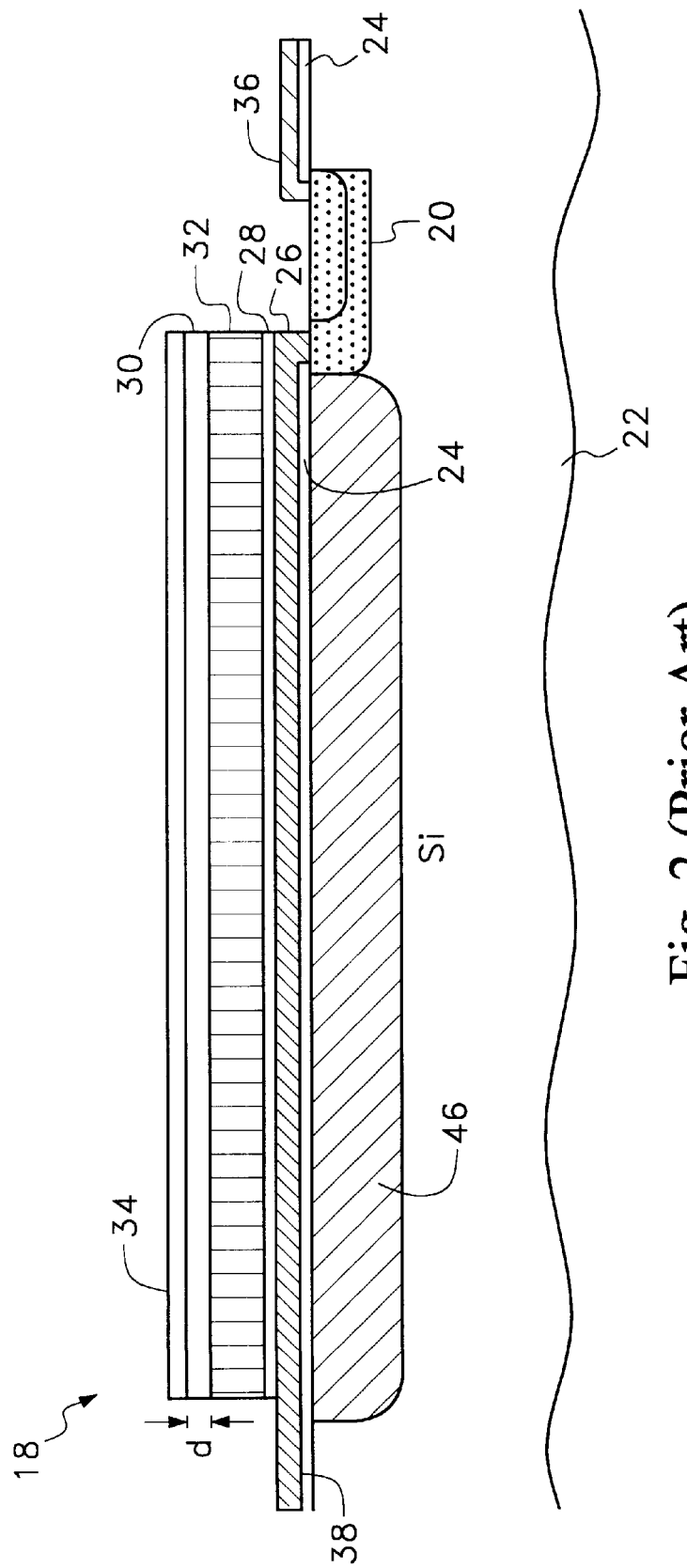
FIG. 2 is a sketch of a prior art phase transition display pixel structure.
Figure 3:
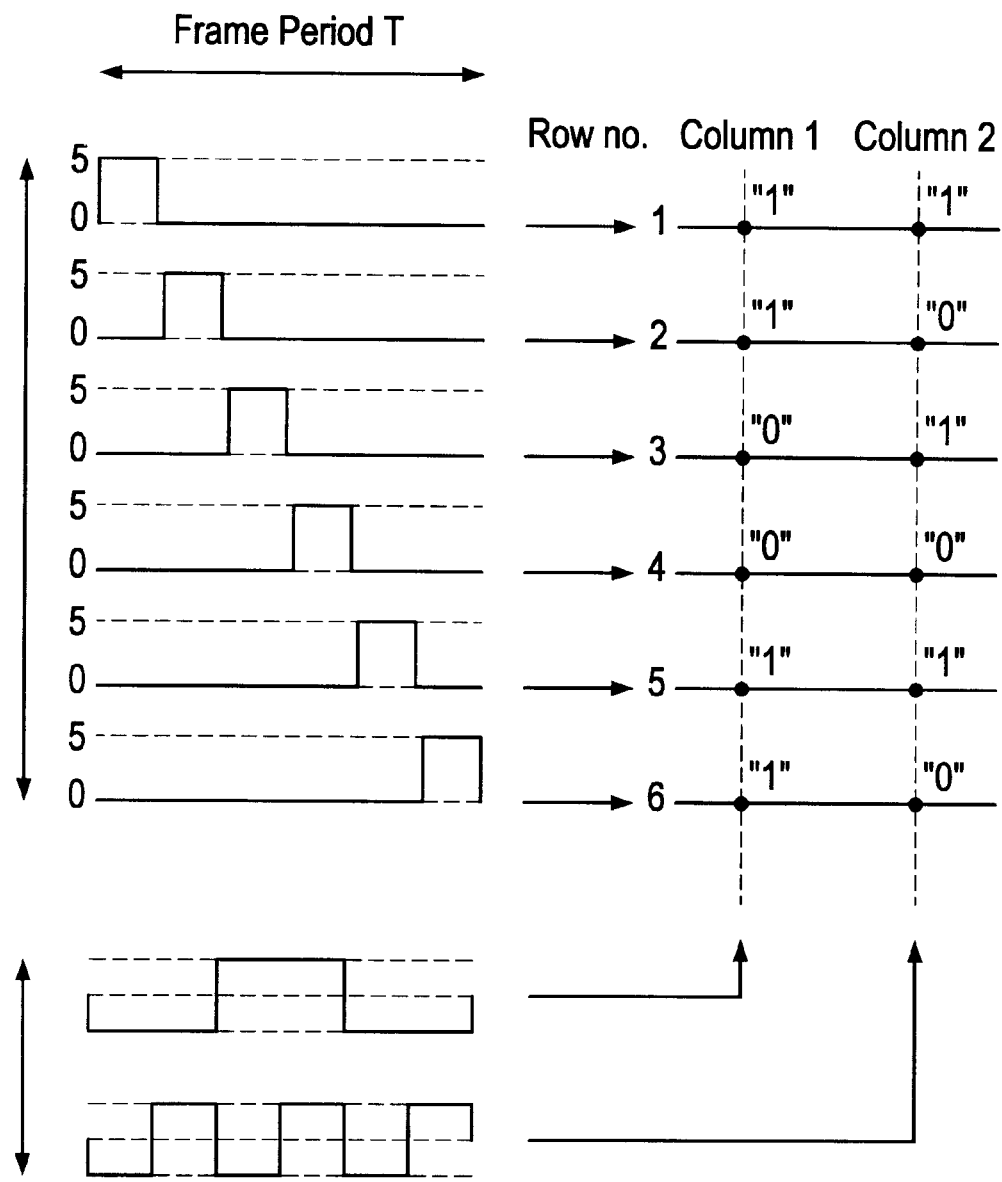
FIG. 3 is an exemplary diagram of the passive matrix phase transition display driving scheme.

Referring now to FIG. 1, there is shown a prior art phase transition flat panel display device architecture 16 comprising a plurality of individual VO2 based pixels 18, arranged in a conventional two dimensional matrix array and fabricated on silicon substrate (not shown). The prior art phase transition display device incorporates the passive matrix of pixels 18, where each pixel is coupled to row and column line by a diode 20, as shown. Each pixel in the matrix is activated by a heater element 26 which is shown in FIG. 2. Each pixel 18 is interconnected by a column and a row line 36, 38 similar to other flat panel displays prevalent in the prior art. The diodes are utilized to prevent current spread and possible cross talk between the pixel elements 18. Without the diodes, the current spread in this type of architecture is inevitable, since there are four nearest loops of parallel connection around each pixel through three neighboring pixels. The diodes 20 are placed as shown to block unwanted currents in each of the loops. This architecture 16, utilizing a "passive matrix" addressing scheme, consists of data being received in parallel from all columns while a particular row is selected by a sequential row pulse, as shown in FIG. 3 (prior art). However, since the total current from all active pixels in one row is large and flows to a single driving row input, current crowding at each of these row inputs often occurs, resulting in undesirable effects.

Referring now to FIG. 2, there is shown the pixel structure 18 of the prior art phase transition display device. In an attempt to increase heat dissipation time for pixels to maintain their temperature either above or below the critical temperature Tc, the prior art fabricated the pixel 18 as a thin membrane suspended over the recessed area 46 of the silicon substrate 22. As shown in FIG. 2, the prior art pixel layer structure comprised a first insulating film 24, a heater element 26, insulating film 28, mirror film 30, VO2 film 32, and top protective layer 34. The first insulating film 24 is connected to the substrate via narrow bridges to minimize the lateral heat flow along the film to the substrate. The heater 26 is made of nickel chromium (NiCr), high resistive Aluminum or polysilicon (polySi) etc . . . the latter having a thickness of approximately 500 nm. The heater element 26 is utilized to provide heat to the pixel 18, in order to induce the phase transition in a VO2 film 32 located above. Power is applied to the heater 26 through a pair of narrow contacts made from NiCr and disposed over the above-described silicon nitride bridges. NiCr material is used for the contacts because of the need to minimize the heat transfer to the substrate. Among the conductors, NiCr possesses a relatively low coefficient of thermal conductors. The first contact, which is disposed over the insulating bridge 36, is coupled to the heater element 26 through a pn junction. The heater 26 is connected to the n-side and the first contact is connected to the p-side of the pn junction. The second contact 38 is also disposed over the bridge and directly coupled to the heating element 26.

Disposed over the heater element 26 is a second insulating film. The second insulating film 28 is utilized to isolate mirror element 30 located above, from the heating element 26.

Disposed over the second insulating film 28 is the mirror element 30 made of a film of Aluminum, Vanadium, Silver or other highly reflective material.

Disposed over the mirror element 30 is the film of VO2 32. The VO2 film 32, along with the mirror element 30, forms an optical resonator, which modulates light utilizing the phase transitions of the VO2 32. The VO2 film 32 along with mirror element 30 determines the reflective coefficient R of each pixel 18, which depends on the phase state of the VO2 film 32. The VO2 32 along with the mirror 30 creates either a constructive interference pattern or a destructive one depending on the phase state of the VO2 film 32 and the wavelength of light being modulated. The constructive interference pattern provides the maximum value of R for each pixel 18, while the destructive interference provides the minimum value of R.

Grown and disposed over the VO2 32 is a protective layer 34, which is also a part of the optical resonator and is preferably a film of Vanadium pentoxide (V2O5). The protective film 34 represents a stable and transparent insulator in the temperature range of interest. Both the VO2 32 and protective film V2O5 34 can be deposited in the same process and grown sequentially under different oxygen pressure.

Figure 7A:
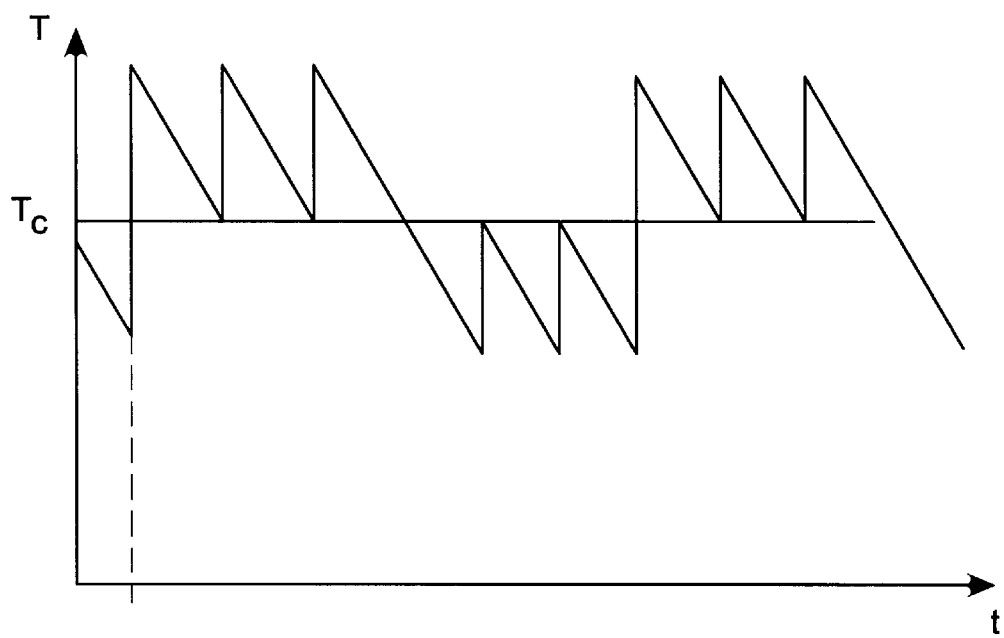
FIG. 7A is a view of the temperature variation of a pixel around an ambient value corresponding to Tc in response to selective heating pulses according to the operation of the present invention.
Figure 7B:
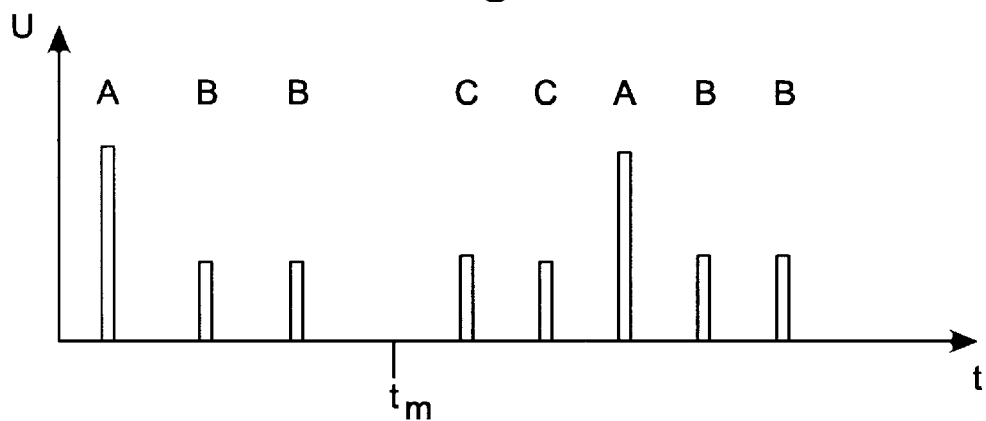
FIG. 7B is a view of the application of heating pulses as a function of time.
Figure 7C:
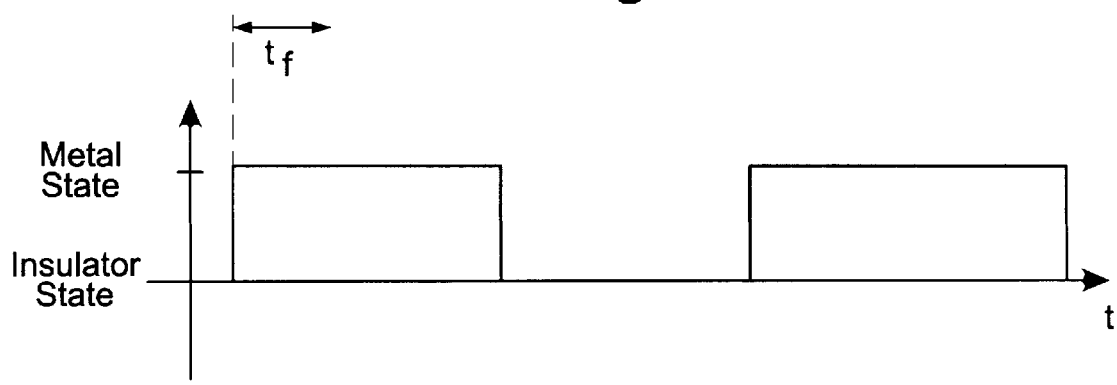
FIG. 7C is a view of the state of a pixel in response to selective application of the heating pulses over time according to the operation of the present invention.

Referring to FIGS. 7A–C, there are shown graphs illustrating the operation of the pixels included in the phase transition display according to the present invention. Note that, with regard to FIGS. 7A–C, FIG. 7A shows the pixel display temperature as a function of time t; FIG. 7B represents application of heating pulses of amplitude "A" to cause a phase transition, and pulses of amplitude "B" and "C" to maintain a phase state for the metallic and insulator states respectively. FIG. 7C represents the corresponding reflectance state change of the pixel associated with the temperature change noted above. During operation, a short electrical pulse A, powerful enough to raise the temperature of the pixel above the $T_c$, is applied to a heater element of a particular pixel in a known manner, which causes a phase transition of a $VO_2$ film to the metal state. This transition causes the brightness and color of the pixel to be changed, for example from a yellow green to a dark green. If it is desired to maintain the pixel in the metallic state, the next pulse (B) should arrive at a refresh time $t_r$ when the temperature of the pixel is still above the $T_c$. In this case, the frame time $t_f$ and the pulse amplitude are adjusted to keep the pixel in the "on" (i.e. metallic) state using periodic pulses of certain amplitudes, which elevate the pixel temperature by a certain $\Delta T$ (approximately 5–10 degrees C.) above $T_c$. Failure to provide a pulse of sufficient amplitude to maintain the temperature above Tc (e.g. at $t_m$) causes the temperature to decrease below Tn to cause transition to the insulator state. Similarly, when pixels are in the "off" (i.e. insulator)

state, it is also beneficial to keep the pixels at a temperature ΔT (approximately 5–10 degrees C.) below $T_c$. Accordingly, heat pulses of amplitude C are applied to maintain the temperature of the pixel display within the desired range of Tc. The temperature $T_c$ thus becomes a reference point of the heat kinetics with a deviation of approximately ±10–20 degrees from $T_c$. Such a narrow departure from $T_c$ is possible in high quality films where the hysteresis of the phase transition of only a few degrees is present.

Figure 4:
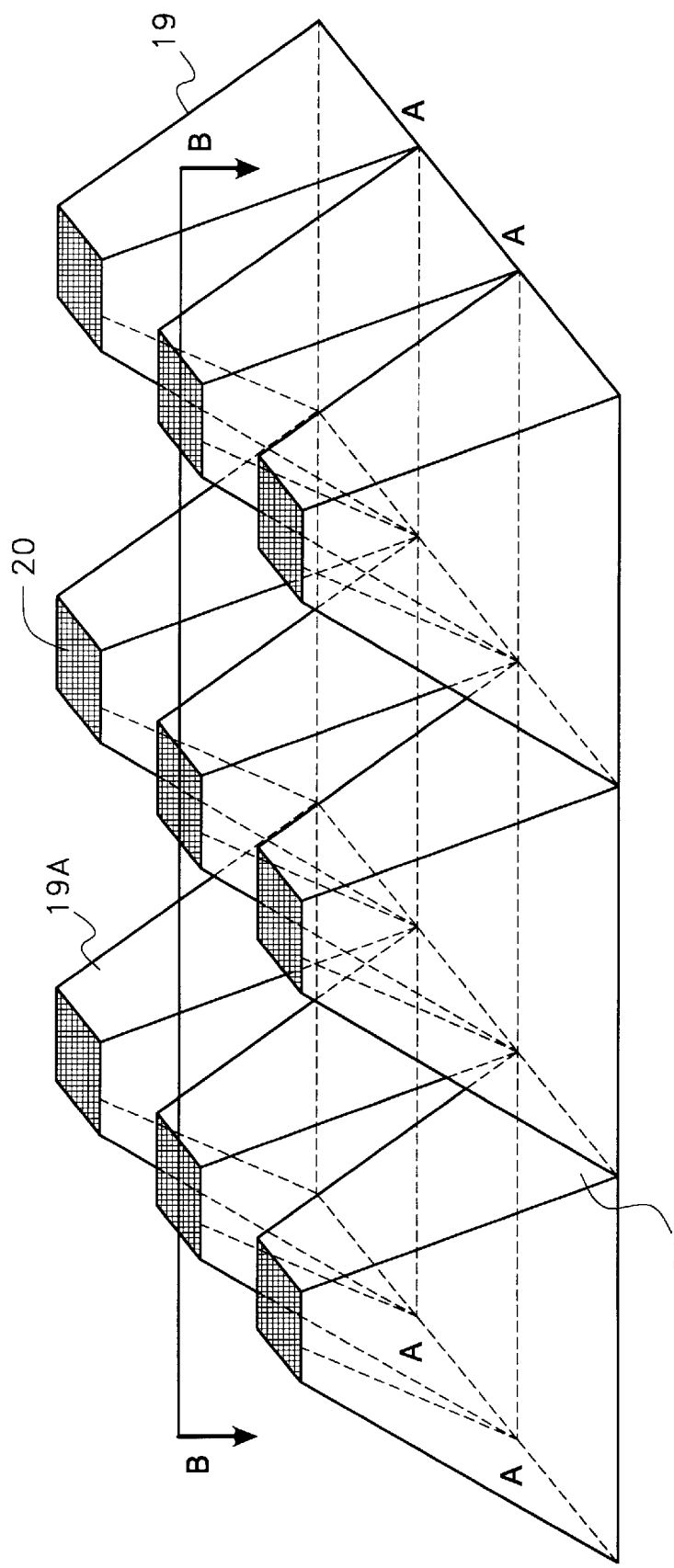
FIG. 4 is a perspective view of the periodic, pyramidal shape of the silicon substrate and mesa formation of the pixel structure of the present invention prior to aerogel deposition.
Figure 5:
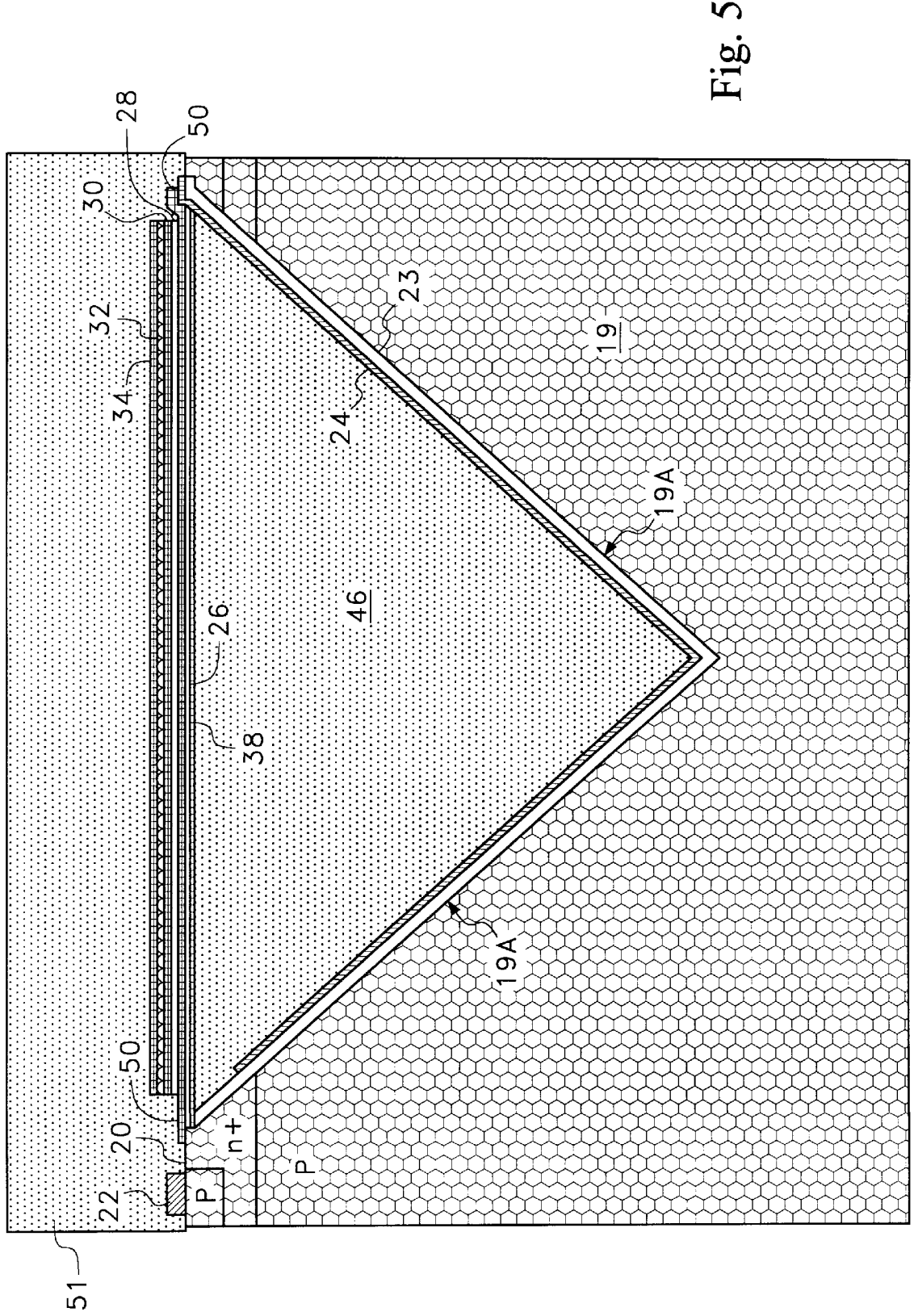
FIG. 5 is a cross-sectional view of the pixel layer structure of the present invention.
Figure 6:
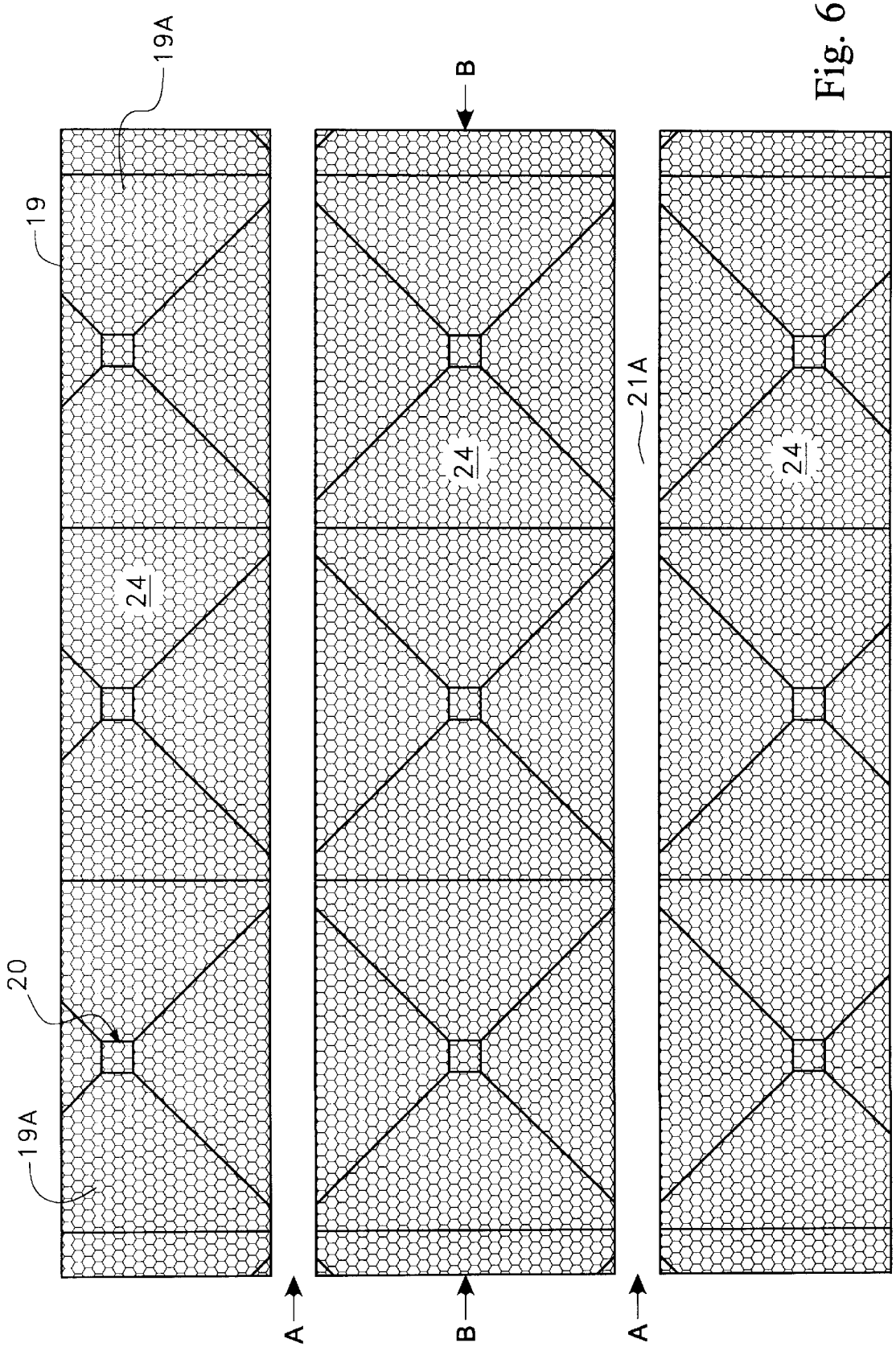
FIG. 6 is a top view of the pixel structure fabrication of the present invention prior to aerogel deposition showing the top mesas and the etched metal strips for forming wide metal row lines.

Referring now to FIGS. 4–6, the pixel fabrication process and design of the present aerogel-based pixel structure will be described. In referring to FIGS. 4–6 of the present invention, like reference numerals are used to indicate like parts. FIG. 4 illustrates the periodic, pyramidal shape of the surface of silicon substrate 19 with mesas 20 on top of each pyramid, prior to aerogel deposition. Each mesa includes a p-n junction formed on top of it. Triangular shaped trenches 21 between the pyramids are used for accommodating the aerogel layer. FIG. 6 shows a top view of the pixel surface prior to aerogel deposition. The surface is coated with a metal film except strips 21A of the etched metal formed along lines A to isolate the wide metal row lines 24.

FIG. 5 provides a cross-sectional view along lines B—B in FIGS. 4 and 6 of the pixel layer structure 18 of the present invention. The pixel formation process of the present invention is as follows. An appropriately patterned and crystallographically oriented Si wafer is etched using heated KOH (Potassium Hydroxide) to form a Si substrate surface pattern 19. The substrate surface 19 comprises a series of periodically spaced pyramid structures having a top surface defining mesas 20. The mesas have dimensions of preferably 10×10 um, on which p-n junctions are formed. The surface of the Si substrate 19 has sloped sides 19A which form trenches 21 of a triangular profile, as shown in FIGS. 4 and 5. In the preferred embodiment, the trenches are approximately 70 um deep. A layer of insulating film 23, preferably Silicon Dioxide (SiO2) of thickness 150 nm is then deposited on the substrate 19 to isolate metal lines from the Si substrate. The entire surface is then coated (sputtered) with a metallized material as a film for future row lines 24. Preferably, the film material is Al having a thickness of approximately 1 um. Referring to FIGS. 4 and 6, photolithography processing and metal etching along the lines on the surface labeled A split the metal film into horizontal strips, which form the wide row metal lines 24 of approximately 100 um extending to the top mesas 20 for contact with the heater element 26 (FIG. 5). This row metalization minimize the problem of current crowding and potential drop across the row lines described in the prior art, since the row metal lines, which carry a relatively large current, are made wider (100 um). As one can ascertain, because the row metal is placed or deposited underneath the pixels, this provides a high optical fill factor since no obscuration of pixel light occurs. In the preferred embodiment, Al is used as the row metal over other metals such as Pt (Platinum), W (Tungsten), Au (Gold) and others because of its relatively high conductivity and compatibility with driver circuitry fabrication.

As can be seen in FIG. 5, each mesa 20 contains a pn junction fabricated prior to the metal and SiO2 layer 23 depositions by conventional processes such as ion implantation and implant annealing. A thick, insulative layer 46 of aerogel is then applied to fill the trenches 21 so that the top mesas 20 are planarized with the aerogel layer 46, in accordance with available aerogel deposition technology. An insulative film 38, preferably SiO2, is then applied to the aerogel layer 46 for protection, making the wafer ready for further processing. The further pixel processing includes deposition of a thin film 26 of $TaSi_2$ as a heating element, preferably having a thickness of 100 um. Unlike the NiCr and polySi heater elements used in the prior art membrane-based designs which required high temperature annealing (up to 900° C.), the $TaSi_2$ film does not need any heating above 450° C., while its resistance can be varied within a range of 50–500 K'Ω, depending on the application. An insulating film 28, preferably a layer of $SiO_2$, is then deposited on top of the heater film 26. A metal mirror film 30, preferably aluminum, is then deposited on top of insulation layer 28 and a VO2 active layer 32 is then deposited on top of mirror film 30. Aluminum column lines 22 are placed on the pixel surface and extend to the p+ regions of the pn junctions. The narrow column lines of approximately or less than 10 um (in relation to the wide row lines), carrying only low currents to individual pixels, are deposited on the top pixel surface, as shown in FIG. 5. In order to minimize the heat transfer to the Si mesa posts 20, the wires 50, connecting the row line 24 and column line 22, through the p-n junction, with the heater element 26 are made thin, narrow and preferably from platinum. A protective layer 34 of V2O5 may then be formed on top of the V2O5 film. To further thermally isolate the pixel from the top glass, a thick layer of aerogel 51, preferably 20–40 um, is disposed above the pixel structure.

This topology of small (10×10 um) periodical mesa islands surrounded by a thick aerogel layer has a distinct advantage of having a low heat transfer to the silicon wafer, thus increasing the temperature decay or dissipation time, when heat pulses are applied from heater element 26 to the VO2 film. As one can ascertain, in the improved pixel design of the present invention, the aerogel layer 46 eliminates the need for air gaps for pixel thermal insulation. This simplifies the technology and permits the display to be operated in either air or in a gas such as Xe gas, rather than the prior art phase transition display which is required to operate in a vacuum to function effectively. The combination of a deep layer of the aerogel, having a thermal conductivity coefficient of 1.5 to 3 times (depending on the preparation technique) lower than air and a material density only 0.13 g/cm$^3$ (grams per cubic centimeter) with the low temperature deposition of the $TaSi_2$ heater, permits a much simpler fabrication process than that disclosed in the prior art. Because the $TaSi_2$ material does not require high temperature annealing, pixel processing is thus entirely compatible with driver circuitry, which may be monolithically integrated with the pixel array structure shown in FIG. 1 and fabricated prior to the array on the wafer periphery. In particular, two difficult manufacturing steps, namely, membrane release and polysilicon deposition with sequential high-temperature processing are eliminated. In addition, the energy necessary to heat the pixel to a given temperature is smaller due to the thinner heater film (100 nm of the $TaSi_2$ versus 500 nm of the prior art polysilicon needed to maintain the membrane integrity and flatness), thus further reducing the amplitude of the applied heat pulses.

Simulations of the decay time in a pixel with uniform 40 um thick aerogel film have been performed with successful results. Utilizing this aerogel thickness, the decay time even in air reach acceptable levels for display operation values of 4–6 milliseconds (ms). Analysis has shown that with 5 ms decay times and thickness of aluminum row metal films of approximately 1 um, the maximum row current can be reduced to an acceptable value of 0.3 amps (per row) for a display having a matrix number of 640×480 pixels. This same approach may also be used for fabrication of such devices as uncooled IR cameras which current employ two dimensional arrays of VO2 based barometers on the membranes and which operate in a vacuum. Utilization of the aerogel deposition process described above can significantly simplify the fabrication and thus reduce the manufacturing cost of such devices.

While there has been shown and described the preferred embodiments of the invention, other modifications and variations to the invention will be apparent to those skilled in the art from the foregoing disclosure and teachings. For example, while $TaSi_2$ is the preferred material for heater element 26, an alternative embodiment may utilize as a heater film the material Vanadium Oxide $VO_x$ where x represents a variable number of oxygen atoms. Preferably, the $VO_x$ material may be of approximately 30 nm in thickness. Thus, while only certain embodiments of the invention have been specifically described herein, it will be apparent that numerous modifications may be made thereto without departing from the spirit and scope of the invention.

What is claimed is:

1. In a display device including a plurality of pixels arranged in a predetermined configuration, each said pixel comprising a substrate and a light modulating material for selectively modulating a predetermined wave length of light by transitioning between a first and a second state in response to pixel heating, wherein said material in said first state causes destructive interference in the predetermined wave length of light and in said second state causes constructive interference in the predetermined wave length of light, the improvements therewith comprising a layer of aerogel disposed beneath said light modulating material to increase the heat dissipation time for display operation.

2. The device of claim 1, wherein said predetermined configuration of said pixels is a two dimensional matrix.

3. The device of claim 1, further comprising a heater element disposed over said layer of aerogel and a mirror element disposed between said light modulating material and said heater element.

4. The device of claim 1, wherein said light modulating material is Vanadium Dioxide ($VO_2$).

5. The device of claim 1, further comprising a layer of tantalum silicide $TaSi_2$ film disposed over said layer of aerogel.

6. In a display device including a plurality of pixels arranged in a predetermined configuration, each said pixel comprising a substrate and a light modulating material for selectively modulating a predetermined wave length of light by transitioning between a first and a second state in response to pixel heating, wherein said material in said first state causes destructive interference in the predetermined wave length of light and in said second state causes constructive interference in the predetermined wave length of light and the substrate includes periodically spaced mesas, wherein an area between said mesas defines a pixel cavity, the improvements therewith comprising a layer of aerogel disposed beneath said light modulating material to increase the heat dissipation time for display operation.

7. The device of claim 6, which further includes a p-n junction formed on each said mesa and coupled to said heating element.

8. The device of claim 6, wherein said pixel cavities are formed by an anisotropic etch of crystallographically oriented Si substrate.

9. The device of claim 6, wherein each said periodically spaced mesa comprises an area of 10×10 um.

10. The device of claim 9, wherein said periodically spaced mesas are pyramid-shaped.

11. In a display device including a plurality of pixels arranged in a predetermined configuration, each said pixel comprising a substrate, a first insulating layer disposed on said substrate and a light modulating material for selectively modulating a predetermined wave length of light by transitioning between a first and a second state in response to pixel heating, wherein said material in said first state causes destructive interference in the predetermined wave length of light and in said second state causes constructive interference in the predetermined wave length of light, the improvements therewith comprising a layer of aerogel disposed beneath said light modulating material to increase the heat dissipation time for display operation.

12. The device of claim 11, which further includes a metal layer disposed on said first insulating layer for carrying current to said device.

13. The device of claim 12, wherein said metal layer is approximately 100 microns (um) wide and disposed beneath the pixel structure.

14. The device of claim 11, further comprising a heater element disposed over said layer of aerogel and a second insulating layer disposed between said aerogel layer and said heater element.

* * * * *